United States Patent
Jiang et al.

(10) Patent No.: US 10,581,270 B2
(45) Date of Patent: Mar. 3, 2020

(54) EQUIVALENT-CONDUCTANCE-COMPENSATED GLOBALLY-LINEAR SYMMETRIC METHOD FOR OBTAINING POWER FLOWS IN DC POWER NETWORKS

(71) Applicant: SHENZHEN UNIVERSITY, Shenzhen, Guangdong (CN)

(72) Inventors: Hui Jiang, Guangdong (CN); Jianchun Peng, Guangdong (CN)

(73) Assignee: SHENZHEN UNIVERSITY, Shenzhen, Guangdong (CN)

(*) Notice: Subject to any disclaimer, the term of this patent is extended or adjusted under 35 U.S.C. 154(b) by 110 days.

(21) Appl. No.: 16/002,598

(22) Filed: Jun. 7, 2018

(65) Prior Publication Data

US 2018/0331570 A1 Nov. 15, 2018

Related U.S. Application Data

(63) Continuation of application No. PCT/CN2017/084360, filed on May 15, 2017.

(51) Int. Cl.
*H02J 13/00* (2006.01)
*G06F 17/50* (2006.01)
(Continued)

(52) U.S. Cl.
CPC .......... *H02J 13/0003* (2013.01); *G06F 17/16* (2013.01); *G06F 17/5036* (2013.01);
(Continued)

(58) Field of Classification Search
CPC .. H02J 13/0003; H02J 1/00; H02J 1/06; H02J 1/14; G06F 17/5036; G06F 17/16; G06F 2217/78
(Continued)

(56) References Cited

FOREIGN PATENT DOCUMENTS

| CN | 103904643 A | 7/2014 |
| CN | 103956733 A | 7/2014 |

(Continued)

OTHER PUBLICATIONS

International Search Report and Written Opinion issued in PCT/CN2017/084360, dated Feb. 8, 2018, 9 pages.

*Primary Examiner* — Hal Kaplan
(74) *Attorney, Agent, or Firm* — Hamre, Schumann, Mueller & Larson, P.C.

(57) ABSTRACT

An equivalent-conductance-compensated globally-linear symmetric method for obtaining power flows in a DC power network, including: establishing an equivalent-conductance-compensated globally-linear function that relates all bus translation voltages to a bus injection power according to given bus load parameters and given bus source parameters of the DC power network; establishing an equivalent-conductance-compensated globally-linear symmetric matrix-equation model for power flows in the DC power network according to the equivalent-conductance-compensated globally-linear function and a given slack bus serial number; establishing an equivalent-conductance-compensated globally-linear symmetric matrix relation between non-slack bus injection powers and all the bus translation voltages by using M-P inversion of matrices according to the equivalent-conductance-compensated globally-linear symmetric matrix-equation model; and calculating each bus per-unit voltage and each branch-transferred power in the DC power network according to the equivalent-conductance-compensated globally-linear symmetric matrix relation.

5 Claims, 2 Drawing Sheets

(51) Int. Cl.
    *H02J 1/00*     (2006.01)
    *H02J 1/06*     (2006.01)
    *G06F 17/16*    (2006.01)
    *H02J 1/14*     (2006.01)
(52) U.S. Cl.
    CPC .............. *H02J 1/00* (2013.01); *H02J 1/06* (2013.01); *G06F 2217/78* (2013.01); *H02J 1/14* (2013.01)
(58) Field of Classification Search
    USPC .......................................................... 307/42
    See application file for complete search history.

(56)     References Cited

FOREIGN PATENT DOCUMENTS

| | | |
|---|---|---|
| CN | 105745809 A | 7/2016 |
| JP | H0847174 A | 2/1996 |
| WO | 2016183805 A1 | 11/2016 |

US 10,581,270 B2

EQUIVALENT-CONDUCTANCE-COMPENSATED GLOBALLY-LINEAR SYMMETRIC METHOD FOR OBTAINING POWER FLOWS IN DC POWER NETWORKS

CROSS-REFERENCE TO RELATED APPLICATIONS

This application is a continuation of International Patent Application No. PCT/CN2017/084360 with an international filing date of May 15, 2017, designating the United States, now pending. The contents of the aforementioned application, including any intervening amendments thereto, are incorporated herein by reference.

TECHNICAL FIELD

The present application relates to electric power engineering field, and more particularly to an equivalent-conductance-compensated globally-linear symmetric method for obtaining power flows in direct current (DC) power networks.

BACKGROUND

At present, technical and economic advantages of the DC power transmission are accelerating the construction and development of the DC power network. The set of all branch-transferred power flows corresponding to an operation state of the DC power network is the base of its control. Thus a good power flow obtaining method, especially a reliable, fast, accurate and globally-linear one, is expected to be developed urgently.

The existing power flow obtaining method for DC power networks is firstly building a system of nonlinear bus power balance equations as the power flow model, then solving it using iterative method and calculating each branch-transferred power. Resulting from the nonlinearity of the power flow model, the existing method is computation-intensive, time-consuming and may be unreliable in convergence, thus difficult to satisfy the real-time requirement of DC power network control. If the linearized model at an operation base point is used to obtain power flows, the resultant locally linear characteristics will lead to being unable to satisfy the control accuracy requirement under wide range change of the operation point of the DC power network. As a result, the existing power flow obtaining method for DC power networks is either time-consuming and unreliable in convergence, or unable to satisfy the control accuracy requirement under wide range change of the operation point of the DC power network.

SUMMARY

An Embodiment of the present application provides an equivalent-conductance-compensated globally-linear symmetric method for obtaining power flows in a DC power network, thus the method can fast and reliably obtain the power flows in the DC power network and is applicable to wide range change of the operation point of the DC power network.

The present application provides an equivalent-conductance-compensated globally-linear symmetric method for obtaining power flows in a DC power network, which comprises the following steps:

establishing an equivalent-conductance-compensated globally-linear function that relates all bus translation voltages to a bus injection power according to given bus load parameters and given bus source parameters of the DC power network;

establishing an equivalent-conductance-compensated globally-linear symmetric matrix-equation model for power flows in the DC power network according to the equivalent-conductance-compensated globally-linear function and a given slack bus serial number;

establishing an equivalent-conductance-compensated globally-linear symmetric matrix relation between non-slack bus injection powers and all the bus translation voltages by using M-P inversion of matrices according to the equivalent-conductance-compensated globally-linear symmetric matrix-equation model; and calculating each bus per-unit voltage and each branch-transferred power in the DC power network according to the equivalent-conductance-compensated globally-linear symmetric matrix relation.

According to an embodiment of the present application, the equivalent-conductance-compensated globally-linear function that relates all the bus translation voltages to the bus injection power is firstly established according to the given bus load parameters and the given bus source parameters of the DC power network; then, the equivalent-conductance-compensated globally-linear symmetric matrix-equation model for the power flows in the DC power network is established according to the equivalent-conductance-compensated globally-linear function and the given slack bus serial number; after that, the equivalent-conductance-compensated globally-linear symmetric matrix relation between the non-slack bus injection powers and all the bus translation voltages is established by using the M-P inversion of matrices according to the equivalent-conductance-compensated globally-linear symmetric matrix-equation model; and finally, each bus per-unit voltage and each branch-transferred power in the DC power network are obtained according to the equivalent-conductance-compensated globally-linear symmetric matrix relation. Since the invented DC power network power flow obtaining method is based on a globally-linear matrix-equation model, it involves no iterative calculation, it is not only fast and reliable but high in power flow accuracy under wide range change of the operation point of the DC power network.

BRIEF DESCRIPTION OF THE DRAWINGS

In order to explain the technical solution of the embodiments of the present application more clearly, the drawings used in the description of the embodiments will be briefly described hereinbelow. Obviously, the drawings in the following description are some embodiments of the present application, and for persons skilled in the art, other drawings may also be obtained on the basis of these drawings without any creative work.

DETAILED DESCRIPTION OF THE EMBODIMENTS

In the description hereinbelow, for purposes of explanation rather than limitation, specific details such as specific systematic architectures and techniques are set forth in order to provide a thorough understanding of the embodiments of the present application. However, it will be apparent to persons skilled in the art that the present application may also be implemented in absence of such specific details in other embodiments. In other instances, detailed descriptions of well-known systems, devices, circuits, and methods are omitted so as not to obscure the description of the present application with unnecessary detail.

Technical solution of the present application is explained hereinbelow by particular embodiments.

Figure 1:
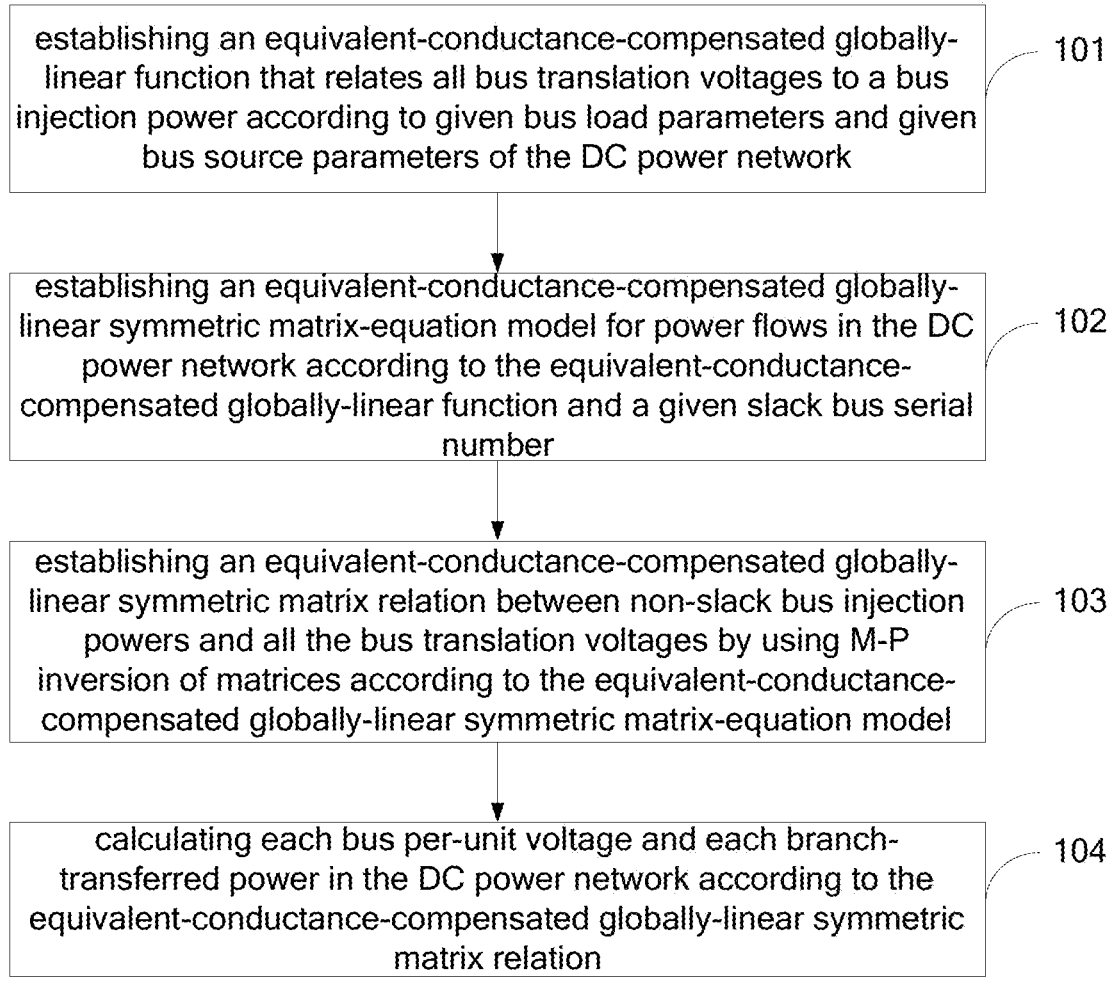
FIG. 1 is an implementation flow chart of an equivalent-conductance-compensated globally-linear symmetric method for obtaining power flows in a DC power network in accordance with an embodiment of the present application.
Figure 2:
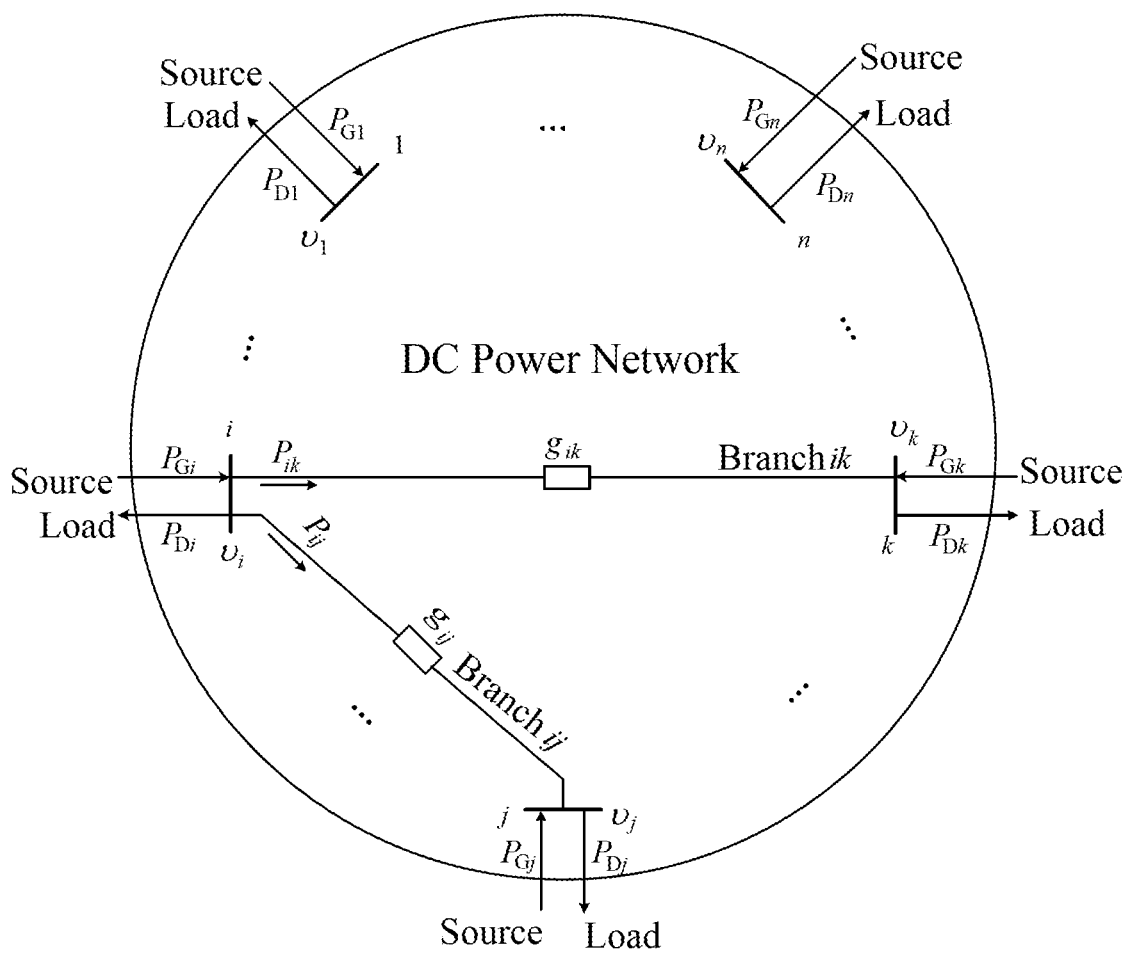
FIG. 2 is a structural schematic diagram of a universal mode of a DC power network in accordance with an embodiment of the present application.

Please refer to FIG. 1, which is an implementation flow chart of an equivalent-conductance-compensated globally-linear symmetric method for obtaining power flows in a DC power network. The equivalent-conductance-compensated globally-linear symmetric method for obtaining the power flows in the DC power network as illustrated in the figure may be conducted according to the following steps:

In step 101, an equivalent-conductance-compensated globally-linear function that relates all bus translation voltages to a bus injection power is established according to given bus load parameters and given bus source parameters of the DC power network.

The step 101 is specifically as follows: the equivalent-conductance-compensated globally-linear function that relates all the bus translation voltages to the bus injection power is established by the following formula:

$$P_{Gi} - P_{Di} = \sum_{k=1, k \neq i}^{n} (1 + v_{i0}) g_{ik} (v_i - v_k)$$

in which, both i and k denote serial numbers of buses in the DC power network and belong to the set of continuous natural numbers, namely belong to $\{1, 2, \ldots, n\}$; n denotes the total number of buses in the DC power network; $P_{Gi}$ denotes the power of the source connected to bus i; $P_{Di}$ denotes the power of the load connected to bus i; $P_{Gi} - P_{Di}$ is bus i injection power; $g_{ik}$ denotes the conductance of branch ik connected between bus i and bus k; $v_{i0}$ denotes the base point translation voltage at bus i and is a per-unit voltage translated by $-1.0$; $v_i$ denotes the translation voltage at bus i; $v_k$ denotes the translation voltage at bus k; and both $v_i$ and $v_k$ are per-unit voltages translated by $-1.0$.

$P_{Gi}$, $P_{Di}$, n, $g_{ik}$, and $v_{i0}$ are all given parameters of the DC power network.

The variables in the above equivalent-conductance-compensated globally-linear function are all global variables rather than increments. In addition, coefficients $(1+v_{i0})g_{ik}$ and $-(1+v_{i0})g_{ik}$ of $v_i$ and $v_k$ in the above equivalent-conductance-compensated globally-linear function are respectively self-conductance and mutual-conductance, which are respectively supplemented with the conductance term $v_{i0}g_{ik}$ and the conductance term $-v_{i0}g_{ik}$ compared with the traditional self-conductance and mutual-conductance. The two supplementary conductance terms, $v_{i0}g_{ik}$ and $-v_{i0}g_{ik}$ of equal absolute value and opposite signs, are produced by viewing $(v_i-v_k)$ of original bus injection power formula as a compositional variable and finding its coefficient at a base point, which are used to compensate the impacts of nonlinear terms of original bus injection power formula. This is the reason why the above function is called the equivalent-conductance-compensated globally-linear function that relates all the bus translation voltages to the bus injection power.

The above equivalent-conductance-compensated globally-linear function is established following operation characteristics of the DC power network. The operation characteristics of the DC power network is that each bus translation voltage translated by $-1.0$ is very small, so replacing the product of a branch conductance and its end bus translation voltage with a constant always causes very small impact on accuracy of power flow results.

In step 102, an equivalent-conductance-compensated globally-linear symmetric matrix-equation model for power flows in the DC power network is established according to the equivalent-conductance-compensated globally-linear function and a given slack bus serial number.

The step 102 is specifically as follows: the equivalent-conductance-compensated globally-linear symmetric matrix-equation model for the power flows in the DC power network is established by the following formula:

$$\begin{bmatrix} P_{G1} - P_{D1} \\ \vdots \\ P_{Gi} - P_{Di} \\ \vdots \\ P_{Gn-1} - P_{Dn-1} \end{bmatrix} = (G_{ij}) \begin{bmatrix} v_1 \\ \vdots \\ v_j \\ \vdots \\ v_n \end{bmatrix},$$

$$G_{ij} = \begin{cases} -(1 + v_{i0}) g_{ij}, & \text{if } j \neq i \\ \sum_{k=1, k \neq i}^{n} (1 + v_{i0}) g_{ik}, & \text{if } j = i \end{cases}$$

in which, i, j and k denote serial numbers of buses in the DC power network and belong to the set of continuous natural numbers, namely belong to $\{1, 2, \ldots, n\}$; n denotes the total number of buses in the DC power network; $P_{G1}$ denotes the power of the source connected to bus 1; $P_{Gi}$ denotes the power of the source connected to bus i; $P_{Gn-1}$ denotes the power of the source connected to bus n−1; $P_{D1}$ denotes the power of the load connected to bus 1; $P_{Di}$ denotes the power of the load connected to bus i; $P_{Dn-1}$ denotes the power of the load connected to bus n−1; $g_{ij}$ denotes the conductance of branch ij connected between bus i and bus j; $g_{ik}$ denotes the conductance of branch ik connected between bus i and bus k; $v_{i0}$ denotes the base point translation voltage at bus i and is a per-unit voltage translated by $-1.0$; the bus numbered n is the given slack bus; $(G_{ij})$ is the equivalent-conductance-compensated bus conductance matrix of the DC power network and does not include the row corresponding to the given slack bus, the dimension of the equivalent-conductance-compensated bus conductance matrix is $(n-1) \times n$; $G_{ij}$ is the row-i and column-j element of the equivalent-conductance-compensated bus conductance matrix $(G_{ij})$; $v_1$ denotes the translation voltage at bus 1; $v_j$ denotes the translation voltage at bus j; $v_n$ denotes the translation voltage at bus n; and $v_1$, $v_j$ and $v_n$ are all per-unit voltages translated by $-1.0$.

$P_{G1}$, $P_{D1}$, $P_{Gi}$, $P_{Di}$, $P_{Gn-1}$, $P_{Dn-1}$, and $(G_{ij})$ are all given parameters of the DC power network.

In the above equivalent-conductance-compensated globally-linear symmetric matrix-equation model, no bus translation voltage is specified as a center of zero-valued reference voltage. All the bus translation voltages are identically treated without any bias, namely, symmetrically treated. This is the reason why the above model is called the equivalent-conductance-compensated globally-linear symmetric matrix-equation model.

In step 103, an equivalent-conductance-compensated globally-linear symmetric matrix relation between non-slack bus injection powers and all the bus translation voltages is established by using M-P inversion of matrices according to the equivalent-conductance-compensated globally-linear symmetric matrix-equation model;

The step 103 is specifically as follows: the equivalent-conductance-compensated globally-linear symmetric matrix relation between the non-slack bus injection powers and all the bus translation voltages is established by the following formula:

$$\begin{bmatrix} v_1 \\ \vdots \\ v_j \\ \vdots \\ v_n \end{bmatrix} = (G_{ij})^+ \begin{bmatrix} P_{G1} - P_{D1} \\ \vdots \\ P_{Gi} - P_{Di} \\ \vdots \\ P_{Gn-1} - P_{Dn-1} \end{bmatrix}$$

in which, both i and j denote serial numbers of buses in the DC power network and belong to the set of continuous natural numbers, namely belong to $\{1, 2, \ldots, n\}$; n denotes the total number of buses in the DC power network; $(G_{ij})^+$ denotes the M-P inversion of the equivalent-conductance-compensated bus conductance matrix $(G_{ij})$ of the DC power network; $P_{G1}$ denotes the power of the source connected to bus 1; $P_{Gi}$ denotes the power of the source connected to bus i; $P_{Gn-1}$ denotes the power of the source connected to bus n−1; $P_{D1}$ denotes the power of the load connected to bus 1; $P_{Di}$ denotes the power of the load connected to bus i; $P_{Dn-1}$ denotes the power of the load connected to bus n−1; $v_1$ denotes the translation voltage at bus 1; $v_j$ denotes the translation voltage at bus j; $v_n$ denotes the translation voltage at bus n; and $v_1$, $v_j$ and $v_n$ are all per-unit voltages translated by −1.0.

Since the variables in the above equivalent-conductance-compensated globally-linear symmetric matrix relation are all global variables (rather than increments), all the bus translation voltages determined by this matrix relation are accurate under wide range change of the bus injection powers or wide range change of the operation point of the DC power network, and the calculation process only involves a step of simple calculation of linear relation, thereby being fast and reliable.

In step 104, each bus per-unit voltage and each branch-transferred power in the DC power network are calculated according to the equivalent-conductance-compensated globally-linear symmetric matrix relation.

The step 104 is specifically as follows: each bus translation voltage in the DC power network is calculated according to the equivalent-conductance-compensated globally-linear symmetric matrix relation; and each bus per-unit voltage and each branch-transferred power in the DC power network are calculated by the following two formulas using the each bus translation voltage:

$$V_j = 1 + v_j$$

$$P_{ij} = g_{ij}(v_i - v_j)$$

in which, both i and j denote serial numbers of buses in the DC power network and belong to the set of continuous natural numbers, namely belong to $\{1, 2, \ldots, n\}$; $V_j$ denotes the per-unit voltage at bus j; $v_i$ denotes the translation voltage at bus i; $v_j$ denotes the translation voltage at bus j; both $v_i$ and $v_j$ are per-unit voltages translated by −1.0; $g_{ij}$ denotes the conductance of branch ij connected between bus i and bus j; and $P_{ij}$ denotes the power transferred by branch ij, which is also called a power flow in a branch.

For all branches of the DC power network, all branch-transferred powers determined by the above formula, $P_{ij} = g_{ij}$ $(v_i - v_j)$, form a set of power flows of the DC power network, thereby realizing the obtaining of the power flows of the DC power network. The above formulas focus on all the bus translation voltages, they are all linear and thus very simple. The calculation of all the bus translation voltages in the DC power network is accurate, fast and reliable under wide range change of the operation point of the DC power network. Consequently, the equivalent-conductance-compensated globally-linear symmetric method for obtaining the power flows in the DC power network is accurate, fast and reliable.

It should be understood that the serial number of each step in the above embodiment doesn't mean the sequence of an execution order, the execution order of different steps should be determined according to their functions and the internal logics, and should not constitute any limitation to the implementation process of the embodiment of the present application.

It can be appreciated by persons skilled in the art that the exemplified units and algorithm steps described in combination with the embodiments of the present application can be implemented in the form of electronic hardware or in the form of a combination of computer software and the electronic hardware. Whether these functions are executed in the form of hardware or software is determined by specific application and designed constraint conditions of the technical solution. For each specific application, persons skilled in the art may use different methods to implement the described functions, but the implementation should not be considered to go beyond the scope of the present application.

What is claimed is:

1. An equivalent-conductance-compensated globally-linear symmetric method for obtaining power flows in a DC power network, the method comprising the following steps:
    establishing an equivalent-conductance-compensated globally-linear function that relates all bus translation voltages to a bus injection power according to given bus load parameters and given bus source parameters of the DC power network;
    establishing an equivalent-conductance-compensated globally-linear symmetric matrix-equation model for power flows in the DC power network according to the equivalent-conductance-compensated globally-linear function and a given slack bus serial number;
    establishing an equivalent-conductance-compensated globally-linear symmetric matrix relation between non-slack bus injection powers and all the bus translation voltages by using M-P inversion of matrices according to the equivalent-conductance-compensated globally-linear symmetric matrix-equation model; and
    calculating each bus per-unit voltage and each branch-transferred power in the DC power network according to the equivalent-conductance-compensated globally-linear symmetric matrix relation.

2. The method of claim 1, wherein the step of establishing the equivalent-conductance-compensated globally-linear function that relates all the bus translation voltages to the bus injection power according to the given bus load parameters and the given bus source parameters of the DC power network comprises:
    establishing the equivalent-conductance-compensated globally-linear function that relates all the bus translation voltages to the bus injection power by the following formula:

$$P_{Gi} - P_{Di} = \sum_{k=1, k \neq i}^{n} (1 + v_{i0}) g_{ik} (v_i - v_k)$$

wherein, both i and k denote serial numbers of buses in the DC power network and belong to the set of continuous natural numbers, namely belong to $\{1, 2, \ldots, n\}$; n denotes the total number of buses in the DC power network; $P_{Gi}$ denotes the power of the source connected to bus i; $P_{Di}$ denotes the power of the load connected to bus i; $P_{Gi}-P_{Di}$ is bus i injection power; $g_{ik}$ denotes the conductance of branch ik connected between bus i and bus k; $v_{i0}$ denotes the base point translation voltage at bus i and is a per-unit voltage translated by $-1.0$; $v_i$ denotes the translation voltage at bus i; $v_k$ denotes the translation voltage at bus k; and both $v_i$ and $v_k$ are per-unit voltages translated by $-1.0$.

3. The method of claim 1, wherein the step of establishing the equivalent-conductance-compensated globally-linear symmetric matrix-equation model for the power flows in the DC power network according to the equivalent-conductance-compensated globally-linear function and the given slack bus serial number comprises:
establishing the equivalent-conductance-compensated globally-linear symmetric matrix-equation model for the power flows in the DC power network by the following formula:

$$\begin{bmatrix} P_{G1} - P_{D1} \\ \vdots \\ P_{Gi} - P_{Di} \\ \vdots \\ P_{Gn-1} - P_{Dn-1} \end{bmatrix} = (G_{ij}) \begin{bmatrix} v_1 \\ \vdots \\ v_j \\ \vdots \\ v_n \end{bmatrix},$$

$$G_{ij} = \begin{cases} -(1 + v_{i0}) g_{ij}, & \text{if } j \neq i \\ \sum_{k=1, k \neq i}^{n} (1 + v_{i0}) g_{ik}, & \text{if } j = 1 \end{cases}$$

wherein, i, j and k denote serial numbers of buses in the DC power network and belong to the set of continuous natural numbers, namely belong to $\{1, 2, \ldots, n\}$; n denotes the total number of buses in the DC power network; $P_{G1}$ denotes the power of the source connected to bus 1; $P_{Gi}$ denotes the power of the source connected to bus i; $P_{Gn-1}$ denotes the power of the source connected to bus n−1; $P_{D1}$ denotes the power of the load connected to bus 1; $P_{Di}$ denotes the power of the load connected to bus i; $P_{Dn-1}$ denotes the power of the load connected to bus n−1; $g_{ij}$ denotes the conductance of branch ij connected between bus i and bus j; $g_{ik}$ denotes the conductance of branch ik connected between bus i and bus k; $v_{i0}$ denotes the base point translation voltage at bus i and is a per-unit voltage translated by $-1.0$; the bus numbered n is the given slack b0us; $(G_{ij})$ is the equivalent-conductance-compensated bus conductance matrix of the DC power network and does not include the row corresponding to the given slack bus, the dimension of the equivalent-conductance-compensated bus conductance matrix is (n−1)×n; $G_{ij}$ is the row-i and column-j element of the equivalent-conductance-compensated bus conductance matrix $(G_{ij})$; $v_1$ denotes the translation voltage at bus 1; $v_j$ denotes the translation voltage at bus j; $v_n$ denotes the translation voltage at bus n; and $v_1$, $v_j$ and $v_n$ are all per-unit voltages translated by $-1.0$.

4. The method of claim 1, wherein the step of establishing the equivalent-conductance-compensated globally-linear symmetric matrix relation between the non-slack bus injection powers and all the bus translation voltages by using the M-P inversion of matrices according to the equivalent-conductance-compensated globally-linear symmetric matrix-equation model comprises:
establishing the equivalent-conductance-compensated globally-linear symmetric matrix relation between the non-slack bus injection powers and all the bus translation voltages by the following formula:

$$\begin{bmatrix} v_1 \\ \vdots \\ v_j \\ \vdots \\ v_n \end{bmatrix} = (G_{ij})^+ \begin{bmatrix} P_{G1} - P_{D1} \\ \vdots \\ P_{Gi} - P_{Di} \\ \vdots \\ P_{Gn-1} - P_{Dn-1} \end{bmatrix}$$

wherein, both i and j denote serial numbers of buses in the DC power network and belong to the set of continuous natural numbers, namely belong to $\{1, 2, \ldots, n\}$; n denotes the total number of buses in the DC power network; $(G_{ij})^+$ denotes the M-P inversion of the equivalent-conductance-compensated bus conductance matrix $(G_{ij})$ of the DC power network; $P_{G1}$ denotes the power of the source connected to bus 1; $P_{Gi}$ denotes the power of the source connected to bus i; $P_{Gn-1}$ denotes the power of the source connected to bus n−1; $P_{D1}$ denotes the power of the load connected to bus 1; $P_{Di}$ denotes the power of the load connected to bus i; $P_{Dn-1}$ denotes the power of the load connected to bus n−1; $v_1$ denotes the translation voltage at bus 1; $v_j$ denotes the translation voltage at bus j; $v_n$ denotes the translation voltage at bus n; and $v_1$, $v_j$ and $v_n$ are all per-unit voltages translated by $-1.0$.

5. The method of claim 1, wherein the step of calculating each bus per-unit voltage and each branch-transferred power in the DC power network according to the equivalent-conductance-compensated globally-linear symmetric matrix relation comprises:
calculating each bus translation voltage in the DC power network according to the equivalent-conductance-compensated globally-linear symmetric matrix relation; and
calculating each bus per-unit voltage and each branch-transferred power in the DC power network by the following two formulas using the each bus translation voltage:

$$V_j = 1 + v_j$$

$$P_{ij} = g_{ij}(v_i - v_j)$$

wherein, both i and j denote serial numbers of buses in the DC power network and belong to the set of continuous natural numbers, namely belong to $\{1, 2, \ldots, n\}$; $V_j$ denotes the per-unit voltage at bus j; $v_i$ denotes the translation voltage at bus i; $v_j$ denotes the translation voltage at bus j; both $v_i$ and $v_j$ are per-unit voltages translated by $-1.0$; $g_{ij}$ denotes the conductance of branch ij connected between bus i and bus j; and $P_{ij}$ denotes the power transferred by branch ij.

* * * * *